ALTERNATIVE PRIOR ART ORGANIZATION 3,115,617
SELECTOR CIRCUITS

Nikolaus Fries, Stuttgart-Feuerbach, Germany, assignor to International Standard Electric Corporation, New York, N.Y., a corporation of Delaware
Filed Aug. 15, 1958, Ser. No. 755,314
Claims priority, application Germany Aug. 28, 1957
6 Claims. (Cl. 340—166)

Figure 1:
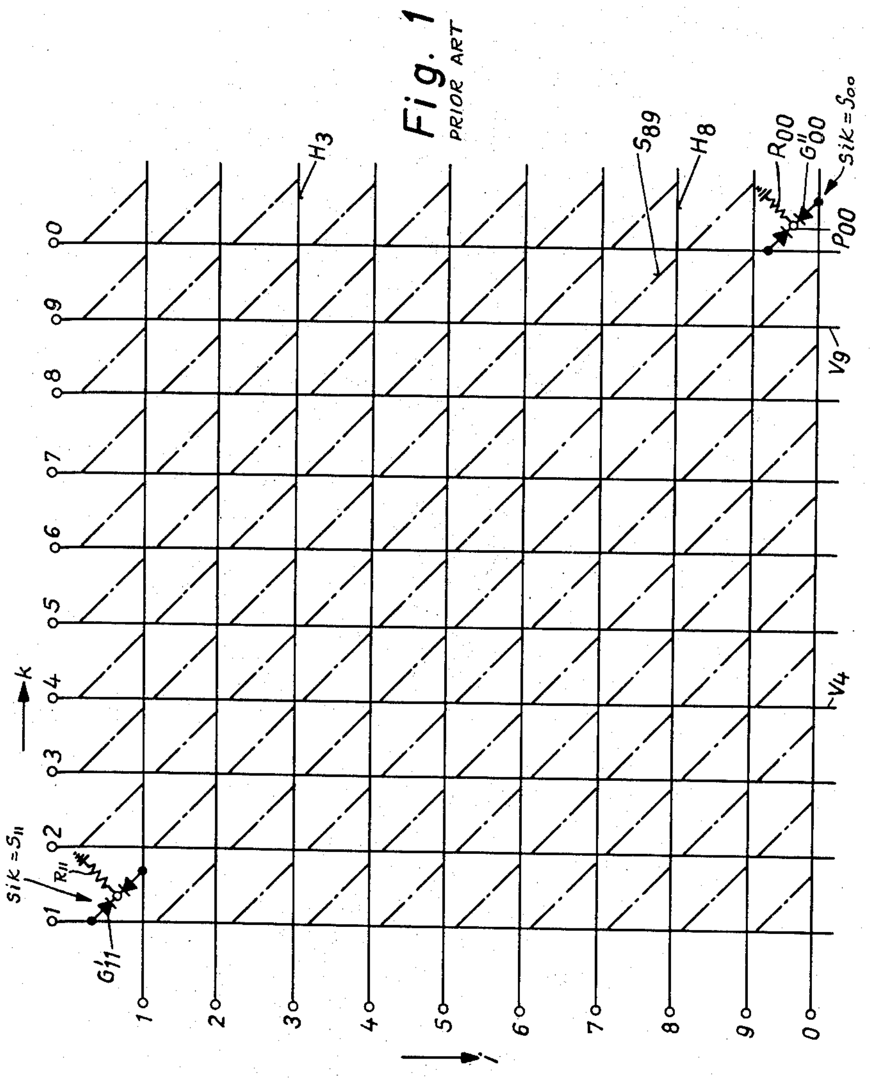
Fig. 1 PRIOR ART

The invention relates to selector circuits or switching units of the matrix or relay-tree (pyramid) type. More particularly, it relates to a selector circuit for electrically marking or manifesting output signal conditions in accordance with a logical switching function of two input signal conditions, i.e., electrically represented numbers, which switching function is symmetrical, i.e., it does not depend on the order of succession of the input signals. In other words, said output signals are indifferent to exchange of the input signals.

It is assumed that within the selector circuit a certain one of a plurality of output circuit elements is marked by the selecting process, for instance, this circuit element—predetermined by the input quantities—is either opened or closed, or certain potential variations are effected at particular output points of an electrical network.

Selector circuits of this type may be used in computers for addition or multiplication of two digits or numbers, which in general may be used for representing any symmetrical switching function $f$, such that $f(x, y)=f(y, x)$, of two integral variables $x$ and $y$, including commutative addition or commutative multiplication. In commutative addition, the order of the terms is immaterial, the augend and addend terms are interchangeable or commutative without altering the algebraic result. In commutative multiplication, the multiplicand and multiplier terms can be interchanged or commutated without altering the product.

Switching units to perform such elementary operations, as mentioned above, are already known in the computer field, i.e., logical switching circuits to perform the switching function $F(i, k)=i+k$ or $F(i, k)=i.k$, i.e., the logical OR function or the logical AND function, respectively, upon two integral input quantities $i$ and $k$, each ranging over the set of integers 1, 2, . . . , $n$. Considering the decimal system, $n=10$, these circuits are provided with twice ten inputs and one hundred outputs. Two different types of such circuits have already been proposed. The first embodiment is of the matrix type, the second, of the relay-tree or pyramid type.

In both of these embodiments there are provided $n^2$ AND-gates, each connecting one of the outputs with one of the inputs $i$ and one of the inputs $k$. The realization of these circuits for all $n^2$ combinations $(i; k)$ requires an unnecessary expense in view of the symmetry condition $f_{ik}=f_{ki}$.

The main object of the invention is to avoid this disadvantage and to devise for this purpose a novel selector circuit of the type provided with twice $n$ inputs representing two input quantities $i$ and $k$ ($i=1$ . . . $n$ and $k=1$ . . . $n$) and adapted to select output signal conditions $f_{ik}$, representing symmetrical or commutative switching functions $f(i, k)=f(k, i)$.

According to the main feature of the invention a selector circuit comprises $(n+1)n/2$ AND-gates corresponding to the combinations $(i; k)$ restricted to values $i\leqq k$ (or $i\geqq k$) and connected with $n$ inputs for the representation of $i$ and with $n$ inputs for the representation of $k$, in such a way that marking potentials representing the above-mentioned input signal conditions are fed directly to the AND-gates, if $i$ equals $k$, and one such potential is fed to all other AND-gates via $n$ bus bars, each of which is connected via decoupling circuit elements with the respective ones of the inputs for the $i$-representation and for the $k$-representation.

Figure 2:
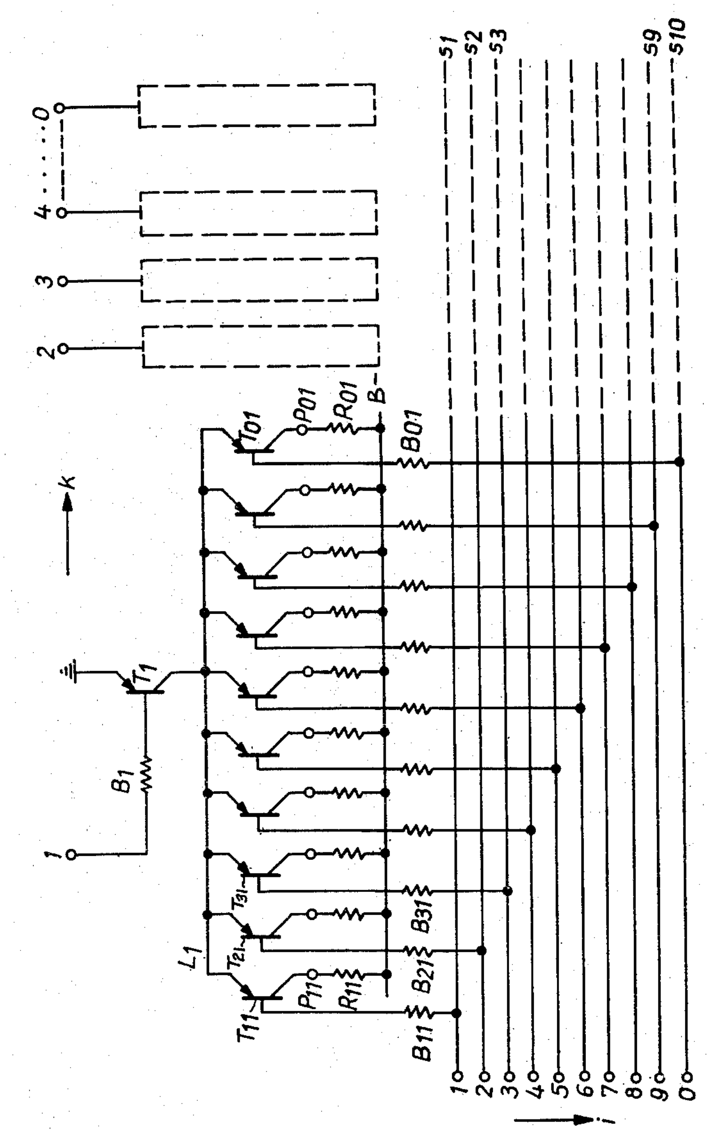
Figure 3:
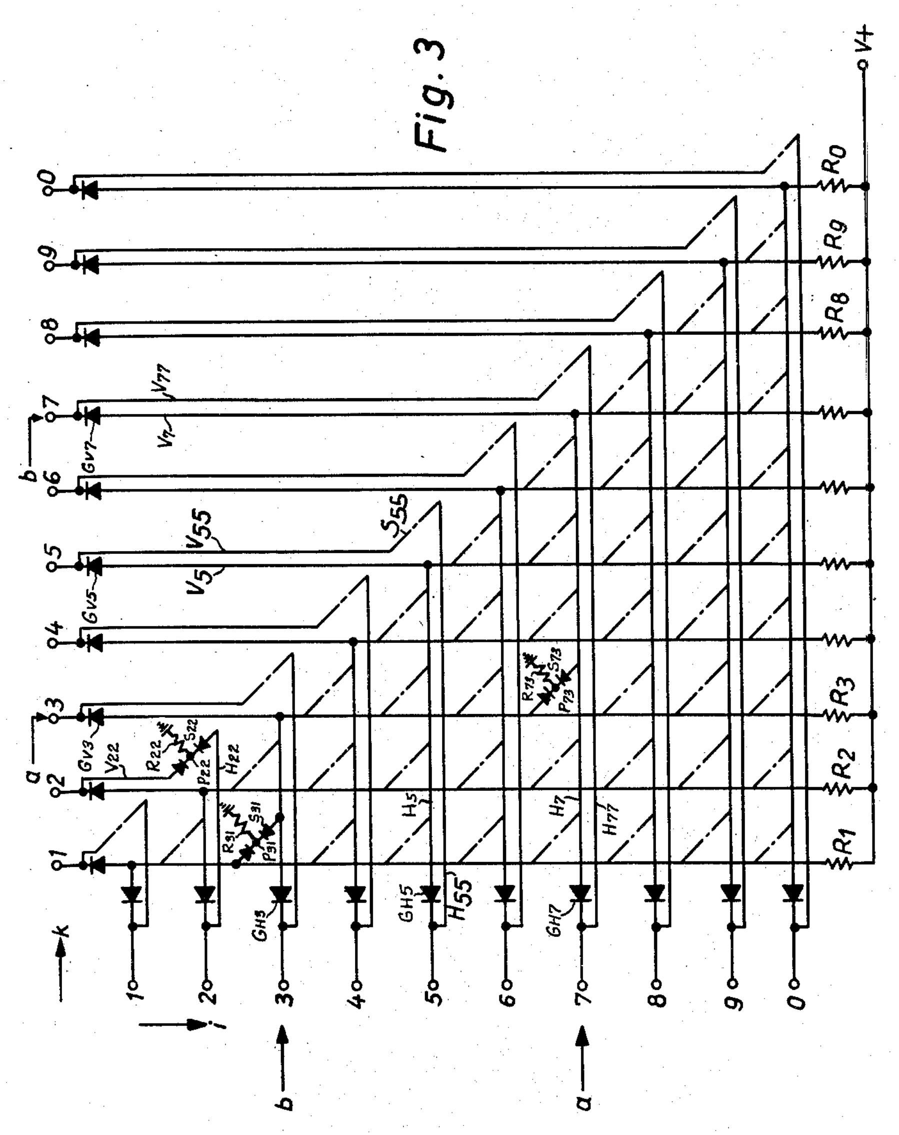
Figure 4:
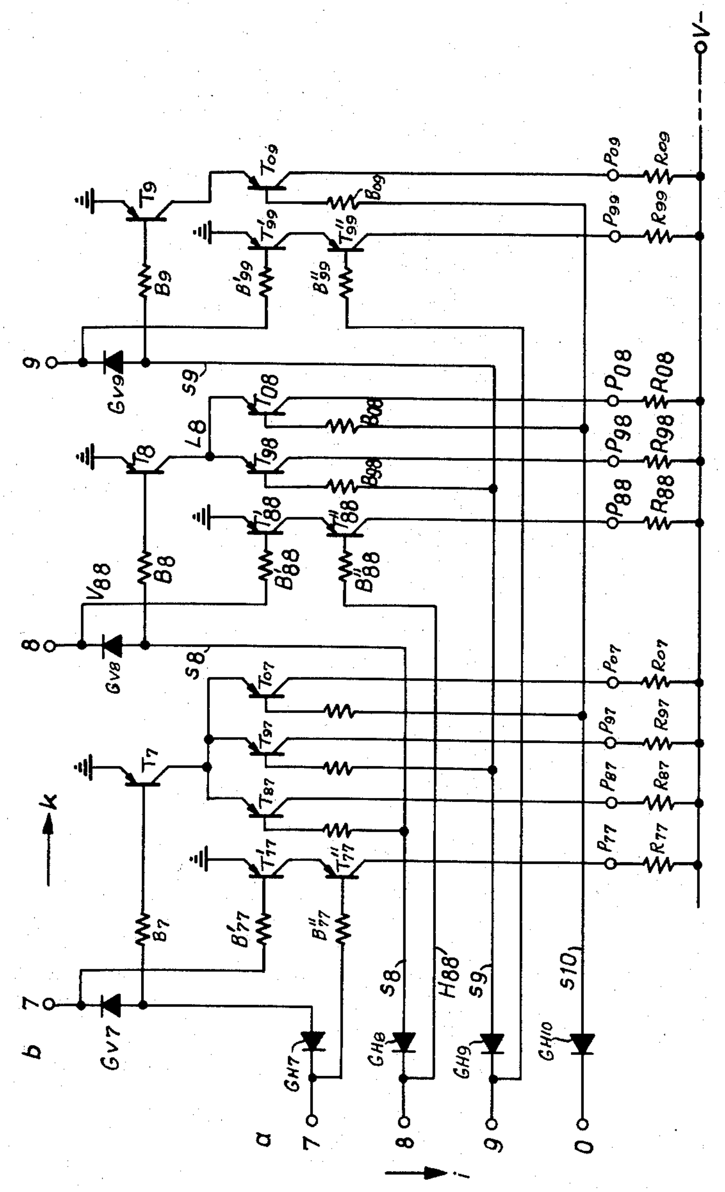

Exemplified embodiments as well as further advantages of the invention will now be described with reference to the accompanying drawings, in which FIG. 1 shows one type of prior art matrix comprising twenty inputs and one hundred outputs, FIG. 2 shows a prior art selector arrangement comprising twenty inputs and one hundred outputs, FIG. 3 shows a new type of matrix according to the invention, comprising twenty inputs and fifty-five outputs and FIG. 4 shows part of an inventive selector arrangement, comprising twenty inputs and fifty-five outputs.

For a better understanding of the invention, an explanation will now be given regarding the mode of operation of conventional types of circuit. Referring to FIG. 1 there is shown a prior art matrix type of embodiment. In this arrangement the line wires H$i$ and the column wires $V_k$ are connected by means of AND-gates $S_{ik}$, e.g. $H_8$ and $V_9$ by means of $S_{89}$. The inputs for the $i$- and $k$-representations or markings are numbered 1, 2 . . . 9, 0. Of the AND-gates only $S_{11}$ (see AND-gate comprising $G'_{11}$, $G''_{11}$ and $R_{11}$) and $S_{00}$ (see AND-gate comprising $R_{00}$, $G'_{00}$ and $G''_{00}$) are shown in detail in FIG. 1, and the remaining ones are denoted schematically by dot-and-dash lines as $S_{89}$. Each of the AND-gates is composed of two diodes $G'_{ik}$ and $G''_{ik}$ and of an operating resistor $R_{ik}$ (circuit elements with items $i$, $k$ or $ik$ are not indicated as such but are indicated by reference numerals denoting the position in the matrix). In the matrix shown in FIG. 1, the unselected, unmarked AND-gates are normally energized by forward flow of constant current, that is, the unindexed or unmarked line and column contacts or terminals ($i=0$, 1 . . . 9 and $k=0$, 1, 2 . . . 9) have positive operating voltages applied to them, and the operating resistors $R_{ik}$ are connected to ground. Owing to the low-forward resistance of the diodes, all of the unindexed output contact, points or terminals $P_{ik}$ will then assume positive potentials, which are practically equal to that of the unindexed line and column terminals. If now a line and a column terminal are simultaneously connected to ground or to a negative marking potential, then the output potential at the respective output terminal $P_{ik}$ will drop to zero. This potential drop is effected with a time constant corresponding to the product of the operating resistance $R_{ik}$ and of the capacity of the output line (not shown in FIG. 1) which is connected to the output terminal $P_{ik}$ (e.g., $P_{00}$).

Another prior art embodiment, known as a selector circuit, is shown in FIG. 2. The inputs $i$ and $k$ are again numbered 1, 2 . . . 9, 0. A group of transistors is connected to each of the input terminals of the $k$ set, and one common transistor $T_k$ is assigned to each such group of transistors. The emitter of the common transistor $T_k$ is connected to ground, while the base electrode is connected via a base resistor $B_k$ to the input terminal $k$, and the collector electrode is connected to a group bar $L_k$ (in FIG. 2 only shown with respect to $k=1$). The transistors $T_{ik}$ are connected to these group bars via their emitter electrodes, in accordance with the labelling $k$. The base electrodes of each such transistor $T_{ik}$ is connected across a base resistor $B_{ik}$ and via a bus bar $s$, with the corresponding input terminal serving the $i$-marking, for example, the base of $T_{11}$ is connected across $B_{11}$ and $s_1$. The collector of each transistor $T_{ik}$ is applied across a working resistor $R_{ik}$ to a common supply voltage. The output terminals $P_{ik}$ are arranged between the transistors $T_{ik}$ and the associated working resistors $R_{ik}$.

In the normal condition the input terminals of the circuit arrangement according to FIG. 2 are connected either to ground or to a positive potential. The supply voltage is negative. Transistors of the p-n-p type are supposed to be used in this case. Then, in the normal condition, all transistors $T_k$ and $T_{ik}$ are blocked and, owing to their high blocking resistance, all output terminals assume a negative potential which is forced upon them by the negative supply voltage B— across the working resistors $R_{ik}$.

If now a negative marking or indexing potential is applied to one of the terminals in the $i$ set and one of the terminals in the $k$ set, then the corresponding series-connecting transistors $T_k$ and $T_{ik}$ will become conductive, an operating current will flow through the associated resistor $R_{ik}$, and, on account of the voltage drop across this resistor, the output potential at the output terminal $P_{ik}$ will be raised. Thus, at a negative marking of the terminals $k=1$ and $i=0$, i.e., when applying the marking potential via $B_1$, and via $s_0$ and $B_{01}$, the transistors $T_1$ and $T_{01}$ will become conductive and, according to the low forward resistance thereof, the voltage drop across $R_{01}$ will cause the potential at the output terminal $P_{01}$ to be raised to almost ground potential value, that is, $P_{01}$ is practically shunted with respect to ground.

According to the invention, the circuitry investment is now substantially reduced in that bus bars are provided to connect the inputs of the AND-gates via decoupling circuit elements respectively with the like-numbered or equal-valued terminals used for $i$- and $k$-markings. Hence there are now required $(n+1)n/2$ instead of $n^2$ AND-gates. In the case of $n=10$ this means a ratio of 55 AND-gates in the new circuit to 100 in the old circuit. Of course, the corresponding saving of 45% will not be fully achieved on account of the expense required for the decoupling purpose, but persons skilled in the art will immediately recognize that the simplification obtained by this saving with respect to the circuitry on the output side will bring about substantial advantages as regards the subsequently arranged structural groups in view of the further utilization of the output data.

As a first embodiment of the invention there is shown in FIG. 3 a matrix of the type comprising two sets of ten inputs, one set being shown as row or line inputs, $i=1, 2 \ldots 9, 0$ and the other set being shown as column inputs $k=1, 2 \ldots 9, 0$. As a rule such a selector circuit is so constructed that the $(n+1)n/2$ AND-gates correspond to the elements of a triangular type of matrix of which the line wires H$i$ and column wires $V_k$, which are connected with each other in the main diagonal $(i=k)$, constitute the bus bars. In the example given in FIG. 3, $n=10$. The line wire $H_5$ is connected with the column wire $V_5$; likewise the other corresponding line and column wires are commoned. In the FIG. 3 matrix, the type of AND gate used corresponds to and is represented the same as the type of AND gate used in the FIG. 1 matrix, each such gate comprising two facing diodes $G'_{ik}$ and $G''_{ik}$ and a resistor $R_{ik}$ extending between ground and the output terminal $P_{ik}$ at the junction of the two diodes. As decoupling means, semiconductor diodes $G_{Hi}$ and $G_{Vk}$ are used, e.g. the diodes $G_{H5}$ and $G_{V5}$ with respect to the bus bar $(\nu=5)$ connected in common to leads $H_5$ and $V_5$. The bus bars are connected through series resistances $R_\nu$ to a supply of positive operating voltage V+; for instance, the bus bar $(\nu=5)$ is connected through $R_5$. The AND-gates in the main diagonals are directly connected with the corresponding input contacts, such as the AND-gate $S_{55}$ for the combination $(i; k)=(5; 5)$ via the lines $H_{55}$ and $V_{55}$ and the AND gate $S_{22}$ for the combination $i=2, k=2$ via the lines $H_{22}$ and $V_{22}$.

In the normal condition, the input terminals are either positively marked or they are connected to any external source of potential. A constant current will then flow through the series resistors $R_0 \ldots R_9$, the matrix diodes and the operating resistors $R_{ik}$, while the decoupling diodes are nonconductive. If now one line input terminal $i$ and one column input terminal $k$ are grounded or given to a negative marking potential, then, in case $i=k$, the two bus bars $\nu=i$ and $\nu=k$ are likewise grounded or negatively biased, via the diodes $G_{Hi}$ or $G_{Vk}$, by which the current flow across the operating resistor $R_{ik}$ will be interrupted, because now the matrix diodes will block the associated AND-gate $S_{ik}$. In the exemplified embodiment under consideration, the lower half of the matrix is provided with AND-circuits, so that $i \geqq k$. However, for the marking of the input terminals there are admitted any kinds of $i$ and $k$, also $i<k$, because marking of the inputs $i$ and $k$ is interchangeable via the bus bars. For the purpose of enabling a better understanding of the interchangeability of the input quantities or value terms $i$ and $k$, there will now be described a further example.

(a) The marking $i=7$, $k=3$: The diode $G_{H7}$ at the left-hand margin and the diode $G_{V3}$ at the upper margin will become conductive, so that the AND-gate $S_{73}$ will become operative to mark or index the commutative function $f(7, 3)$, such marking resulting from the drop of the output terminal $P_{73}$ to ground potential caused by the blocking action of the diodes in $S_{73}$ when the bus bars $H_7$ and $V_3$ are marked or indexed by ground or negative biasing potential.

(b) The marking $i=3$, $k=7$: The diode $G_{H3}$ at the left-hand margin and the diode $G_{V7}$ at the upper margin will become conductive.

Thus the two bus bars $H_3$ and $V_7$ will assume the input marking potential, either ground or negative potential. But $H_3$ is connected to $V_3$ and $V_7$ is connected to $H_7$; hence, the second case $b$ reduces to the first case $a$ and the diodes in $S_{73}$ again block current flow to output point $P_{73}$, so that as in the first case the potential at this output point drops to mark or index the commutative function result depending on the terms 3 and 7, taken in any order. The single gate $S_{73}$ is sufficient to mark the commutative function result and the connections between corresponding H and V input buses eliminate the necessity of a gate such as $S_{37}$, such elimination not impairing the capacity of the FIG. 3 matrix to designate the result of addition or multiplication of the terms 7 and 3, according to whether the matrix is an addition matrix or a multiplication matrix. Assuming for instance that the FIG. 3 matrix is a multiplication matrix, the drop in potential at $P_{73}$ will manifest the product 21 either in the case (a) where $i$ is 7 and $k$ is 3 or in the case (b) where $i$ is 3 and $k$ is 7.

Instead of AND-gates employing semiconductor diodes, it is also possible to employ, preferably in cases where circuit arrangements with a low internal resistance are required, AND-gates consisting each of a series arrangement of an operating resistor and two transistors, the base electrodes of which are connected with the corresponding line or column wire respectively.

A further example according to the invention is embodied as a transistorized selector arrangement. One part thereof, relating to the input terminals $i=7, 8, 9, 0$ and $k=7, 8, 9$ is shown in FIG. 4. This selector circuit is laid out in such a way that a plurality of AND-gates, consisting of transistors of the p-n-p type, are so assembled in groups that a transistor $T_k$ is provided in common for each group, the emitter electrode of the transistor being grounded and the base electrode being connected with the bus bar $s_\nu$ via a base resistor $B_k$, according to $\nu=k$. The collector electrode thereof is connected with a group bar $L_k$ to which are connected the emitter electrodes of transistors $n-k$, transistors $T_{ik}$ with $i=k+1, k+2, \ldots, n$, the base electrodes of which are connected through the base resistors $B_{ik}$ to the bus bars $s_v$ according to $v=i$, while the collector electrodes thereof are connected via operating resistors $R_{ik}$ to a supply voltage provided in common thereto.

For a better understanding, the case $i=9$, $k=8$ will now be described with reference to FIG. 4 of the accompanying drawings. Reference numerals are only given insofar as they relate to the group of transistors for $k=8$. The base electrode of transistor $T_8$, common to the group of transistors $T_{i8}$, is connected through the base resistor $B_8$ to the bus bar $s_8$ and the collector electrode is directly connected to the group bar $L_8$. Two transistors $T_{98}$ and $T_{08}$ have their emitter electrodes connected to this group bar. The example under consideration also relates to case $n=10$. Accordingly, the inputs are enumerated 1, 2, 3, . . . , 8, 9, 0 (not all shown in FIG. 4). However, the number 0 is written instead of number 10. Therefore, number 0 is shown following number 9 in the succession of numbers $i$. For example, if $k$ equals 8 the number $i=k+1$ is 9 and for $i=k+2=10$ the number 0 is written, because of which the successive $i$-numbering is interrupted. Accordingly, the base resistors and the operating resistors of $T_{98}$ and $T_{08}$ are denoted, respectively, by $B_{98}$ and $B_{08}$, and by $R_{98}$ and $R_{08}$. $B_{98}$ and $B_{08}$ are connected, respectively to the bus bars $s_9$ and $s_{10}$, while $R_{98}$ and $R_{08}$ are connected to a negative supply voltage V—.

The circuit arrangement is operated in such a way that in the normal condition all input terminals are coupled to either a positive potential or ground potential. Then, in the normal condition, the transistors $T_k$ and $T_{ik}$ in FIG. 4 are blocked, just as explained for FIG. 2, and all output terminals $P_{ik}$ are at the negative potential determined by the negative supply voltage V—. If now the input terminals $i=9$ and $k=8$ are marked negatively, the bus bars $s_8$ and $s_9$ will become negative via the decoupling diodes $G_{H9}$ at the left-hand margin, and $G_{V8}$ at the upper margin. Transistors $T_8$ and $T_{98}$ will become conductive, permitting current to flow from grounded emitter of transistor $T_8$ across the base of this transistor and to its collector, thence to group bar $L_8$ and to the emitter of transistor $T_{98}$, across the base of the latter transistor and to its collector, thence past the output terminal $P_{98}$ and via resistor $R_{98}$ to the V— line, so that the voltage drop across $R_{98}$ will raise the potential at the output contact $P_{98}$. Differing from the FIG. 2 circuit, the FIG. 4 circuit has a common bus for each pair of correspondingly numbered inputs $i$ and $k$, the common bus being connected to each of the paired $i$ and $k$ input terminals through decoupling diodes. Hence the $i$ and $k$ value marking or indexing may be interchanged without affecting the output result and the same group transistor $T_k$ and series connected transistor $T_{ik}$ are rendered conductive to produce an output manifestation at the same point $P_{ik}$. Thus if the marking in the previously considered example of $i=9$ and $k=8$ is interchanged, that is, by putting $i=8$ and $k=9$, the bus bars $s_8$ and $s_9$ will likewise be marked, but in this case via the diodes $G_{H8}$ at the left-hand margin, and $G_{V9}$ at the upper margin, with the same result as before in rendering $T_8$ and $T_{98}$ conductive to cause output point $P_{98}$ to rise in potential for manifesting the function $f=(i=8, k=9)$, where function $f=(i, k)$ corresponds to commutative multiplication or commutative addition.

If the contacts for $i=k=8$ are marked, then the AND-gate comprising the transistors $T'_{88}$ and $T''_{88}$ will operate and the potential of $P_{88}$ will be raised. The AND-gates for combination $(i; k)$ with $i=k$ are directly connected to the input contacts, in the present case, $i=k=8$, via the base resistor $B'_{88}$ and line $V_{88}$ on one hand, and via the base resistor $B''_{88}$ and line $H_{88}$ on the other hand.

In the FIG. 4 circuit, each transistor $T_k$ and a series connected transistor $T_{ik}$ constitute an AND gate, and each pair of transistors $T'_{ik}$ and $T''_{ik}$ also forms an AND gate. The FIG. 4 circuit requires for two sets of $n$ input terminals a total number of AND gates equal to $(n+1)n/2$, the same number as required by the FIG. 3 circuit. On the other hand, the FIG. 2 circuit requires $n^2$ AND gates for $n$ inputs $i$ and $n$ inputs $k$, each AND gate in the FIG. 2 circuit comprising a group transistor $T_k$ and a series connected transistor $T_{ik}$.

These selector circuits according to the invention are particularly suitable as multiplication or addition matrixes, and voltage changes at the output terminals may control indication of results in any suitable manner, as by controlling number displaying electron-ray tubes. Also, the output terminals may be connected through suitable decoupling elements to denominationally ordered lines for controlling denominationally ordered magnetic or electronic value manifestation or registration, in a manner which will be apparent to a man skilled in the art.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. A selector circuit comprising:

$2n$ signal input circuits arranged in first and second transversely disposed series of $n$ elements each, where $n$ represents an integer greater than 2;

$n(n+1)/2$ switching circuits each operatively connected to produce an output corresponding to a symmetrical switching function of input signals applied to said input circuits, there being one switching circuit coupled to each pair of correspondingly positioned input circuits in said respective series, and other such switching circuits each of which is coupled to two pairs of differently positioned combinations of said input circuits, said two pairs of input circuits including a first pair consisting of an input having a given position in said first series and an input in said second series having a position different from said given position, and a second pair consisting of an element in said first series having a position corresponding to said different position, and an element in said second series having a position corresponding to said given position.

2. A selector circuit as claimed in claim 1, characterized in that said $(n+1)/2$ switching circuits correspond to the elements of a triangle matrix with line wires ($Hi$) and column wires ($V_k$) extending respective $i$ and $k$ input circuits to said switching circuits, the line and column wires of correspondingly positioned input circuits in said respective series being connected with each other in the main diagonal ($i=k$).

3. A selector circuit as claimed in claim 2, characterized in that semiconductor diodes are interposed, as decoupling circuit elements between the correspondingly positioned input circuits in said respective first and second series.

4. A selector circuit as claimed in claim 1 wherein each of said switching circuits comprises a semi-conductor diode AND-gate.

5. A selector circuit as claimed in claim 1, wherein each said switching circuit comprises an operating resistor arranged in series with two transistors, the base electrodes of which are connected with the correspondingly positioned input circuits of said respective first and second series.

6. A selector circuit as claimed in claim 1 wherein said switching circuits are arranged in groups in accordance with the connections thereof to said input circuits in said first series, each said group including a common transistor which is controlled by the corresponding input circuit in said first series, and at least one other transistor in series circuit connection with said common transistor, said other transistor being operatively connected to an associated input circuit in said second series.

References Cited in the file of this patent

UNITED STATES PATENTS

| | | |
|---|---|---|
| 2,476,066 | Rochester | July 12, 1949 |
| 2,844,811 | Burkhart | July 22, 1958 |
| 2,889,537 | Elliott | June 2, 1959 |

OTHER REFERENCES

"Arithmetic Operations in Digital Computers," by Richards, Van Nostrand Co., 1955, pp. 32 and 91.